United States Patent
Shirasuna

(10) Patent No.: US 7,639,430 B2
(45) Date of Patent: Dec. 29, 2009

(54) ZOOM LENS AND IMAGE PICKUP APPARATUS HAVING THE SAME

(75) Inventor: Takashi Shirasuna, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 12/032,979

(22) Filed: Feb. 18, 2008

(65) Prior Publication Data

US 2008/0285146 A1    Nov. 20, 2008

(30) Foreign Application Priority Data

May 14, 2007    (JP)    ............... 2007-127830

(51) Int. Cl.
*G02B 15/14*    (2006.01)
*G02B 9/34*    (2006.01)
*G02B 3/02*    (2006.01)

(52) U.S. Cl. .................. 359/686; 359/691; 359/781; 359/715

(58) Field of Classification Search ............... 359/686, 359/691, 781, 708, 715
See application file for complete search history.

(56) References Cited

U.S. PATENT DOCUMENTS

| 5,710,669 | A | 1/1998 | Endo | |
| 7,248,416 | B2 * | 7/2007 | Saori | 359/680 |
| 7,307,794 | B2 * | 12/2007 | Saori | 359/686 |

FOREIGN PATENT DOCUMENTS

JP    2006-58584    3/2006

* cited by examiner

*Primary Examiner*—Jack Dinh
(74) *Attorney, Agent, or Firm*—Canon USA Inc IP Div

(57) ABSTRACT

A zoom lens includes, from the object side, first and second lens units of negative and positive refractive power. The lens units move during zooming from the wide-angle end to the telephoto end. The first lens unit includes, from the object side, three negative lenses and a positive lens, at least one of the surfaces of these lenses being aspherical. A spherical surface whose center of curvature is on the optical axis and that includes a point of the intersection of a lens surface and the optical axis and a point on the lens surface determined by the effective aperture is referred to as reference spherical surface of the lens surface. In the first lens unit, the radiuses of curvature of the image-side reference spherical surface of the most object-side negative lens and the object-side reference spherical surface of the second most object-side negative lens are appropriately set.

15 Claims, 11 Drawing Sheets

ZOOM LENS AND IMAGE PICKUP APPARATUS HAVING THE SAME

BACKGROUND OF THE INVENTION

1. Field of the Invention

The present invention relates to a zoom lens and an image pickup apparatus having the same and is applicable to photographing systems such as digital cameras, video cameras, and silver-halide film cameras.

2. Description of the Related Art

A so-called negative lead type zoom lens has been known, in which a lens unit of negative refractive power is located on the most object side. Negative lead type zoom lenses are commonly used as wide-field-angle photographing lenses because the close-up photographing distance is comparatively short, a wide field angle can be comparatively easily achieved, and the back focus can be easily increased.

A zoom lens including, in order from the object side, negative, positive, negative, and positive lens units is known as a negative lead type zoom lens for single-lens reflex cameras (U.S. Pat. No. 5,710,669 and Japanese Patent Laid-Open No. 2006-58584).

In U.S. Pat. No. 5,710,669, the first lens unit is separated into a front unit of negative refractive power and a rear unit of negative refractive power, and the rear unit is moved during focusing. U.S. Pat. No. 5,710,669 discloses a zoom lens having a super wide field angle of about 100° at the wide-angle end.

The zoom lens of Japanese Patent Laid-Open No. 2006-58584 has the same lens configuration as that of U.S. Pat. No. 5,710,669. The front unit of the first lens unit consists of two negative lenses. This improves optical performance and achieves a super wide field angle of 110° or more.

In recent years, zoom lenses for digital single-lens reflex cameras have been strongly required to be compact, to have a wide field angle, and to produce a high-quality image.

In general, a negative lead type zoom lens is advantageous to achieving a wide field angle but has a significantly asymmetrical lens configuration. Therefore, when each lens unit moves during zooming, aberrations fluctuate significantly due to asymmetrical change in lens configuration. Therefore, it is difficult to achieve high optical performance throughout the zoom region. In particular, when the lens configuration of the most object-side negative lens unit is not appropriate, it is difficult to achieve high optical performance throughout the zoom region while achieving a wide field angle. For example, off-axis aberrations, especially distortion and astigmatism, are significantly generated at the wide-angle end, and it is difficult to effectively correct these aberrations. In order to effectively correct these aberrations, a large number of lenses are necessary, and therefore the size of the whole lens system is increased.

SUMMARY OF THE INVENTION

The present invention is directed to a wide-field-angle zoom lens having high optical performance throughout the zoom region.

In an aspect of the present invention, a zoom lens includes, in order from the object side to the image side, a first lens unit of negative refractive power, and a second lens unit of positive refractive power. At least the first lens unit and the second lens unit move on the optical axis so that the distance between the first lens unit and the second lens unit decreases during zooming from a wide-angle end to a telephoto end. The first lens unit includes, in order from the object side to the image side, three negative lenses and a positive lens, at least one of the surfaces of these lenses being aspherical. When a spherical surface whose center of curvature is on the optical axis and that includes a point of the intersection of a lens surface and the optical axis and a point on the lens surface determined by the effective aperture is referred to as reference spherical surface of the lens surface, the following condition is satisfied:

$$-2.8 < (r12 + r21)/(r12 - r21) < -1.0$$

where r12 is the radius of curvature of the image-side reference spherical surface of the most object-side negative lens in the first lens unit, and r21 is the radius of curvature of the object-side reference spherical surface of the second most object-side negative lens in the first lens unit.

Further features of the present invention will become apparent from the following description of exemplary embodiments with reference to the attached drawings.

DESCRIPTION OF THE EMBODIMENTS

Embodiments of the present invention will now be described in detail with reference to the drawings.

The zoom lens of the present invention has, from the object side to the image side, a first lens unit of negative refractive power and a second lens unit of positive refractive power.

During zooming from the wide-angle end to the telephoto end, at least the first and second lens units move on the optical axis so that the distance between the first and second lens units decreases.

Although four-unit zoom lenses that include four lens units are shown in the following embodiments, the zoom lens of the present invention may have any number of lens units as long as it has at least two lens units.

Figure 1:
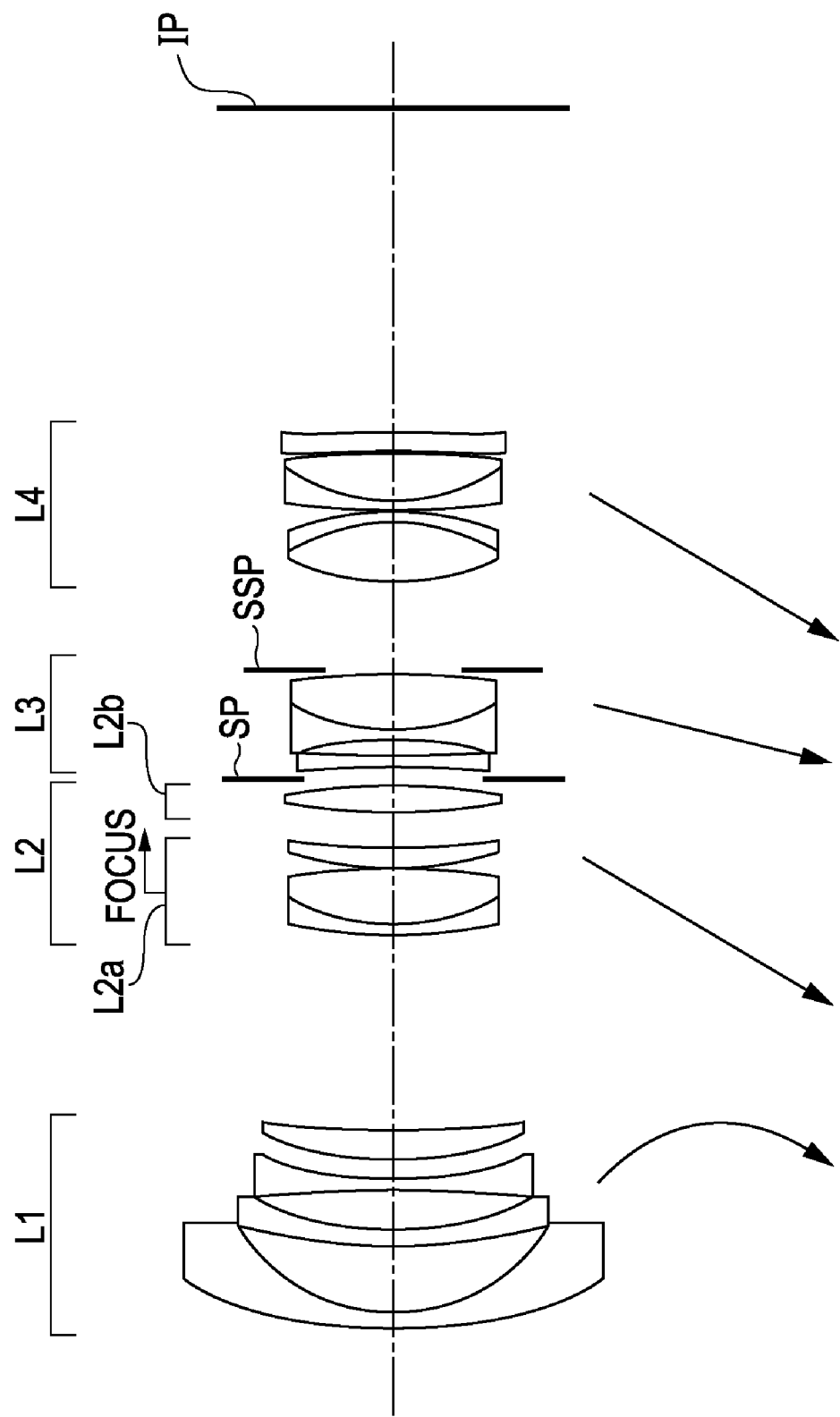
FIG. 1 is a lens sectional view of a zoom lens of Embodiment 1 at the wide-angle end.

FIG. 1 is a lens sectional view of a zoom lens of Embodiment 1 of the present invention at the wide-angle end (short focal length end).

Figure 2:
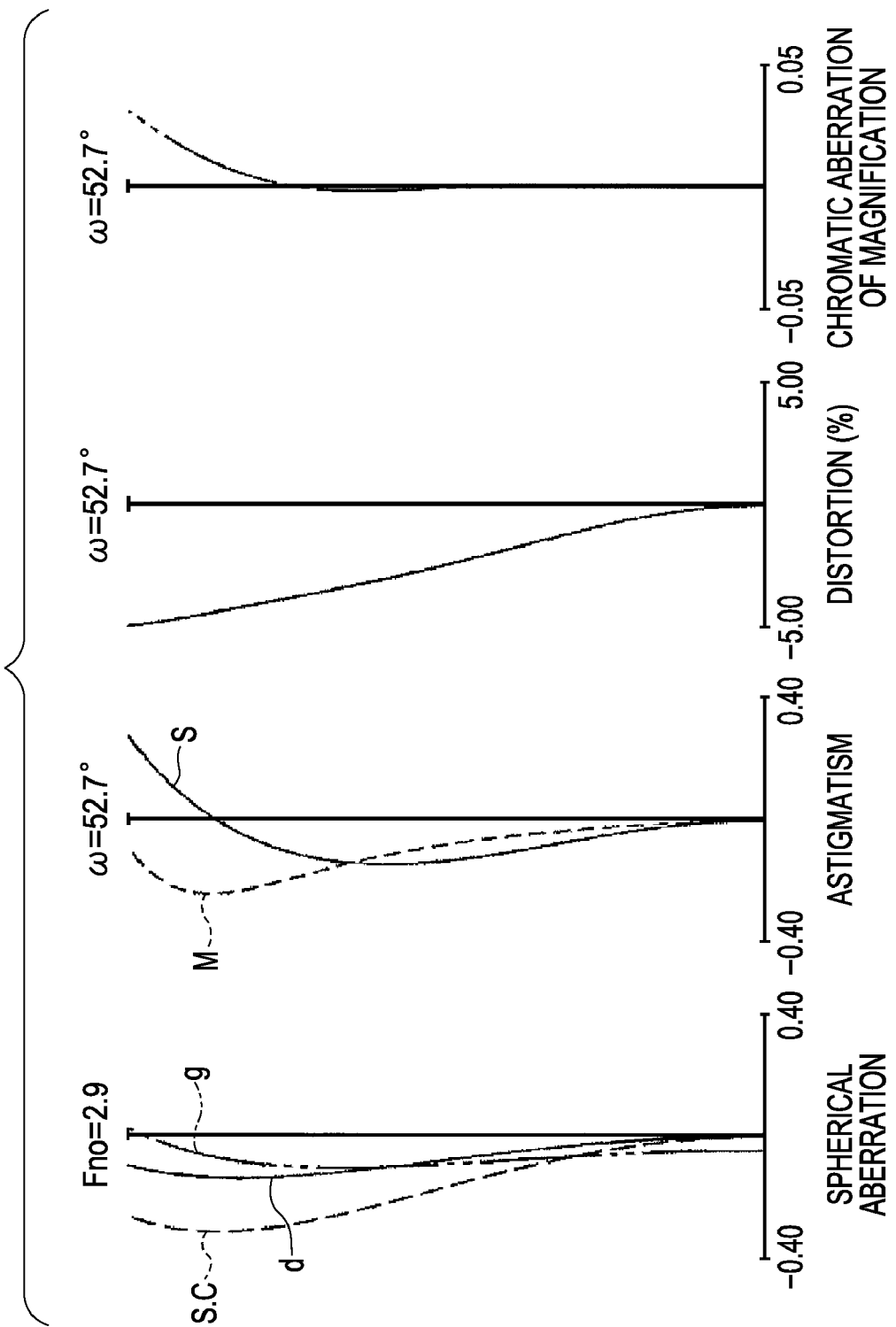
FIG. 2 is an aberration diagram of the zoom lens of Embodiment 1 when the object distance is infinity at the wide-angle end.
Figure 3:
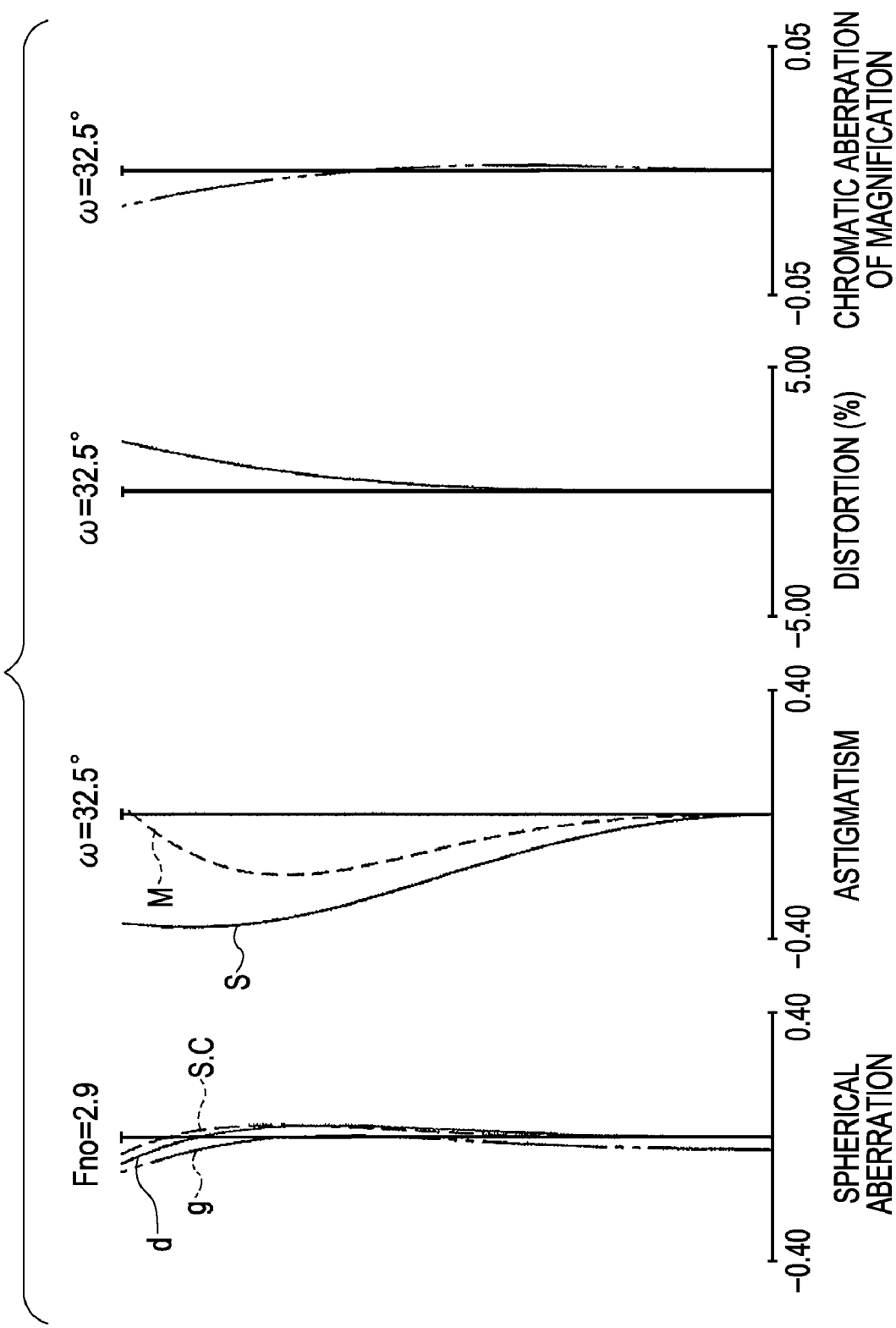
FIG. 3 is an aberration diagram of the zoom lens of Embodiment 1 when the object distance is infinity at the telephoto end.

FIGS. 2 and 3 are aberration diagrams of the zoom lens of Embodiment 1 when the object distance is infinity at the wide-angle end and the telephoto end (long focal length end), respectively.

Figure 4:
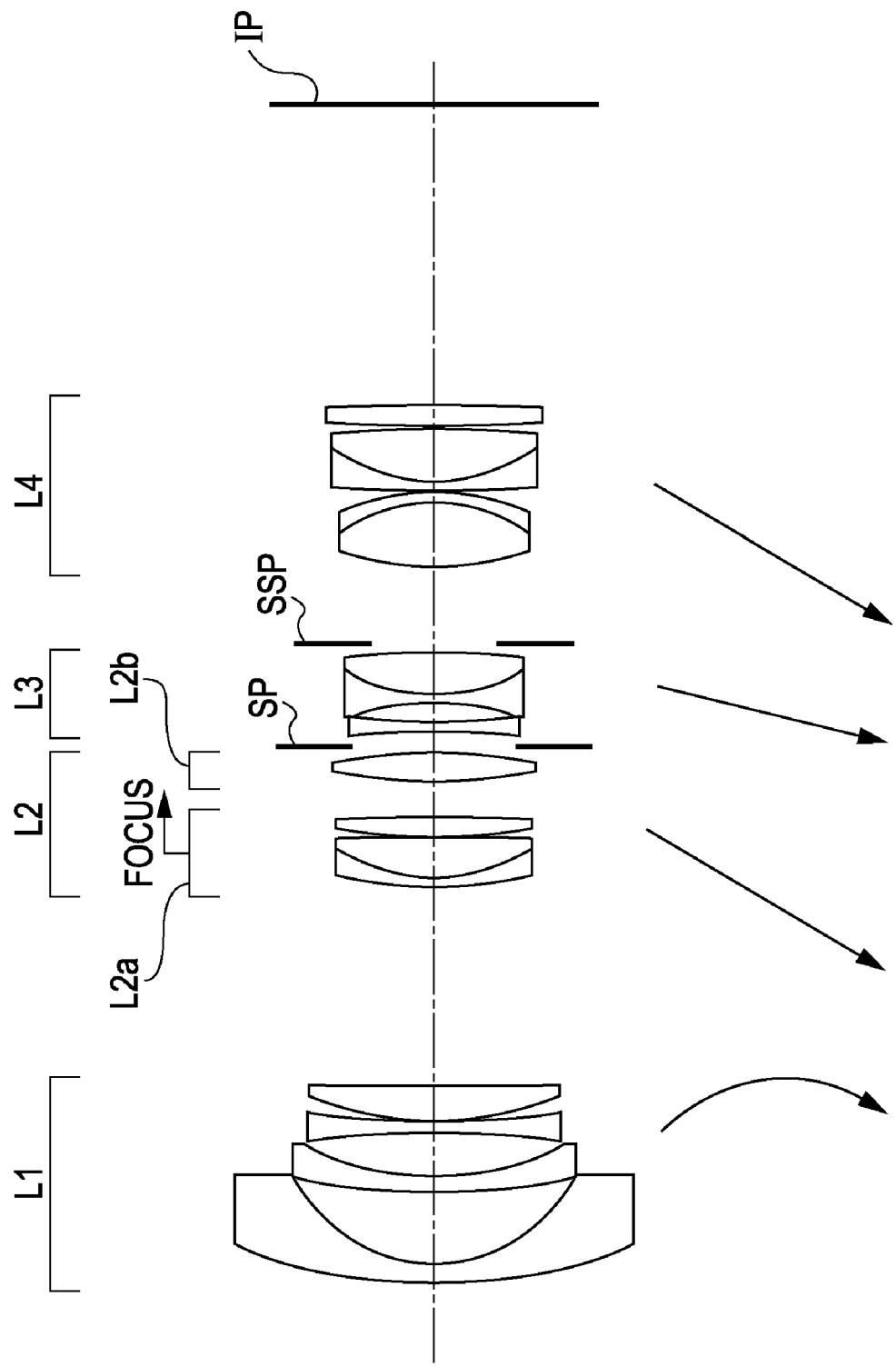
FIG. 4 is a lens sectional view of a zoom lens of Embodiment 2 at the wide-angle end.

FIG. 4 is a lens sectional view of a zoom lens of Embodiment 2 of the present invention at the wide-angle end.

Figure 5:
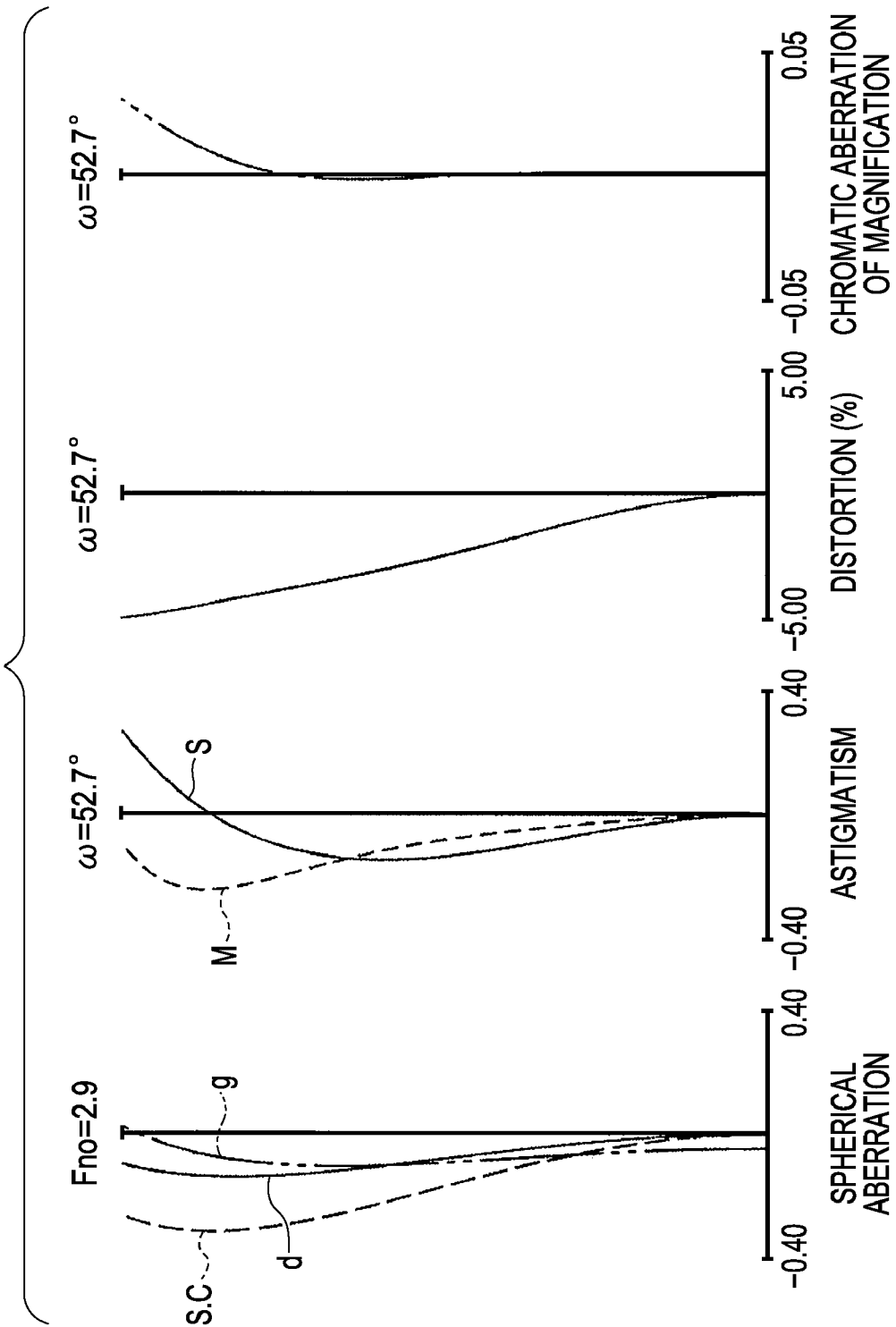
FIG. 5 is an aberration diagram of the zoom lens of Embodiment 2 when the object distance is infinity at the wide-angle end.
Figure 6:
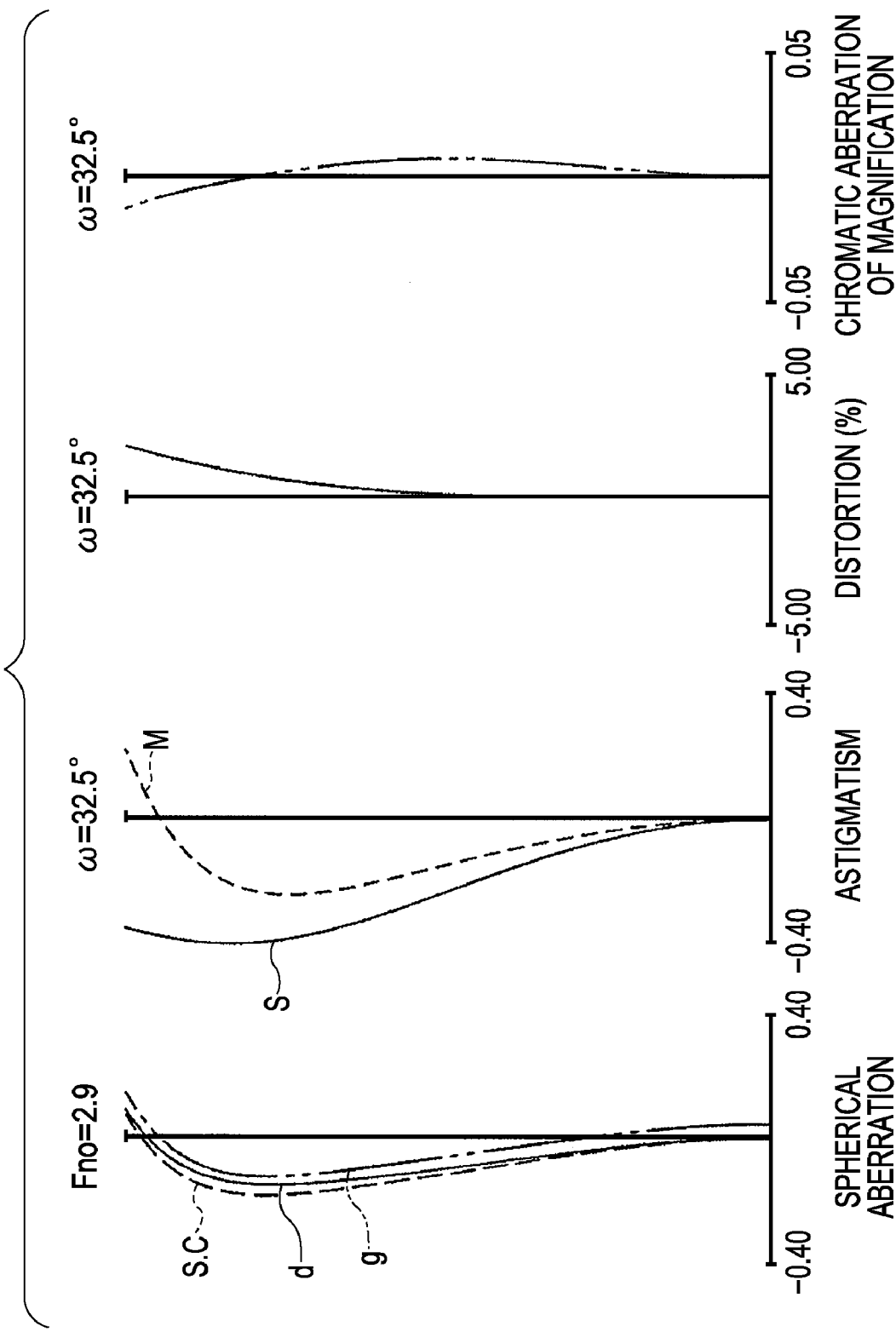
FIG. 6 is an aberration diagram of the zoom lens of Embodiment 2 when the object distance is infinity at the telephoto end.

FIGS. 5 and 6 are aberration diagrams of the zoom lens of Embodiment 2 when the object distance is infinity at the wide-angle end and the telephoto end, respectively.

Figure 7:
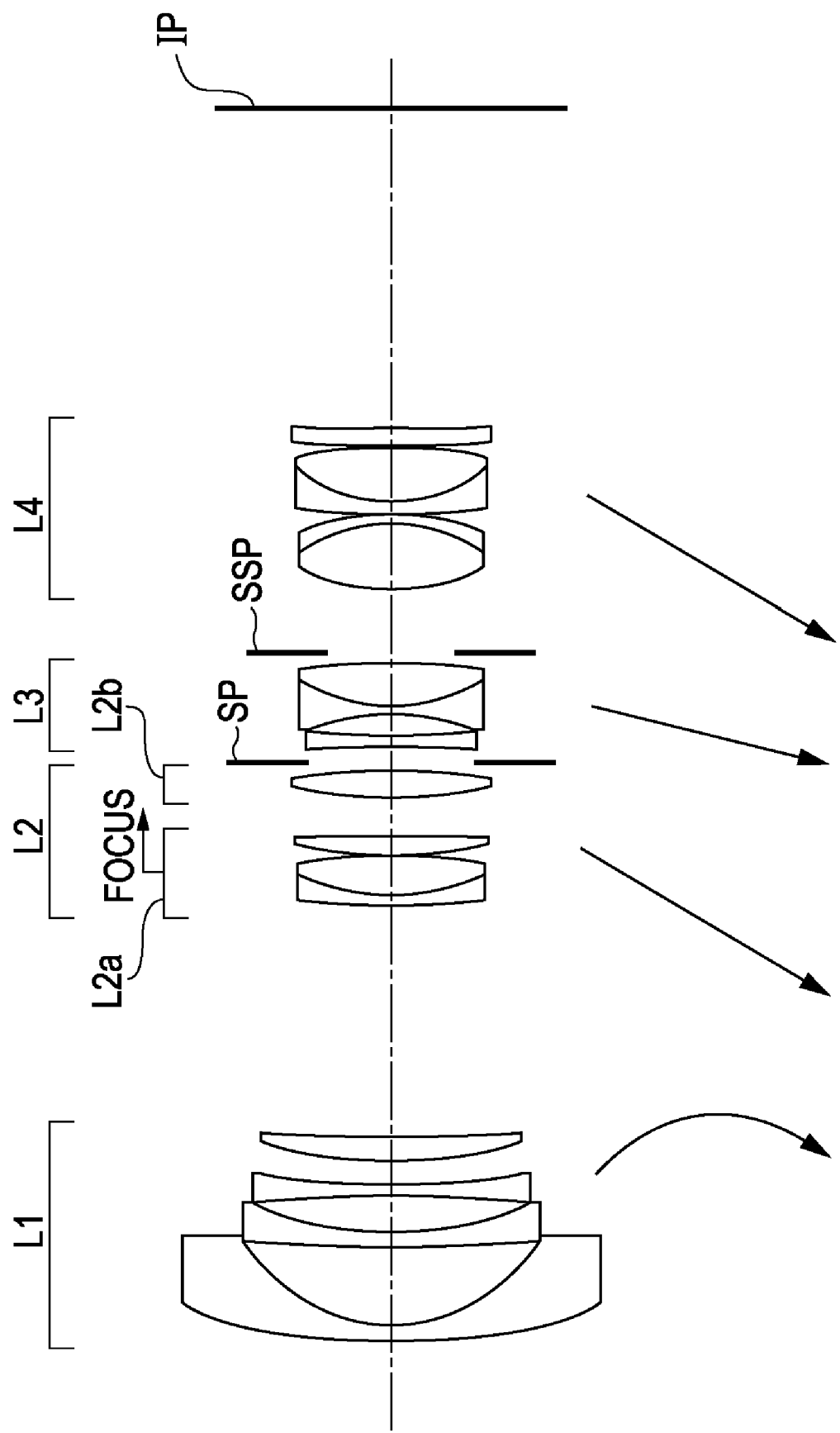
FIG. 7 is a lens sectional view of a zoom lens of Embodiment 3 at the wide-angle end.

FIG. 7 is a lens sectional view of a zoom lens of Embodiment 3 of the present invention at the wide-angle end.

Figure 8:
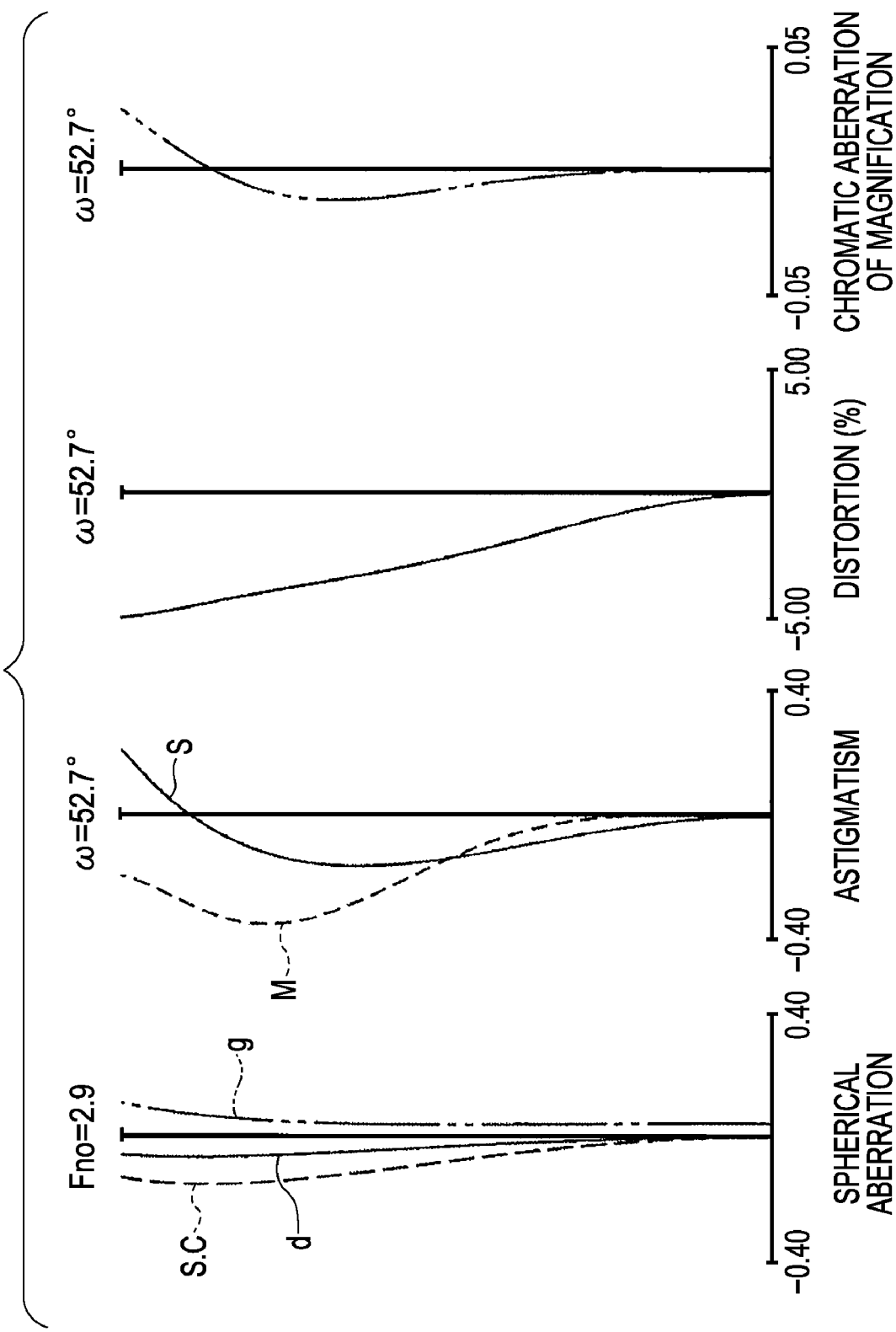
FIG. 8 is an aberration diagram of the zoom lens of Embodiment 3 when the object distance is infinity at the wide-angle end.
Figure 9:
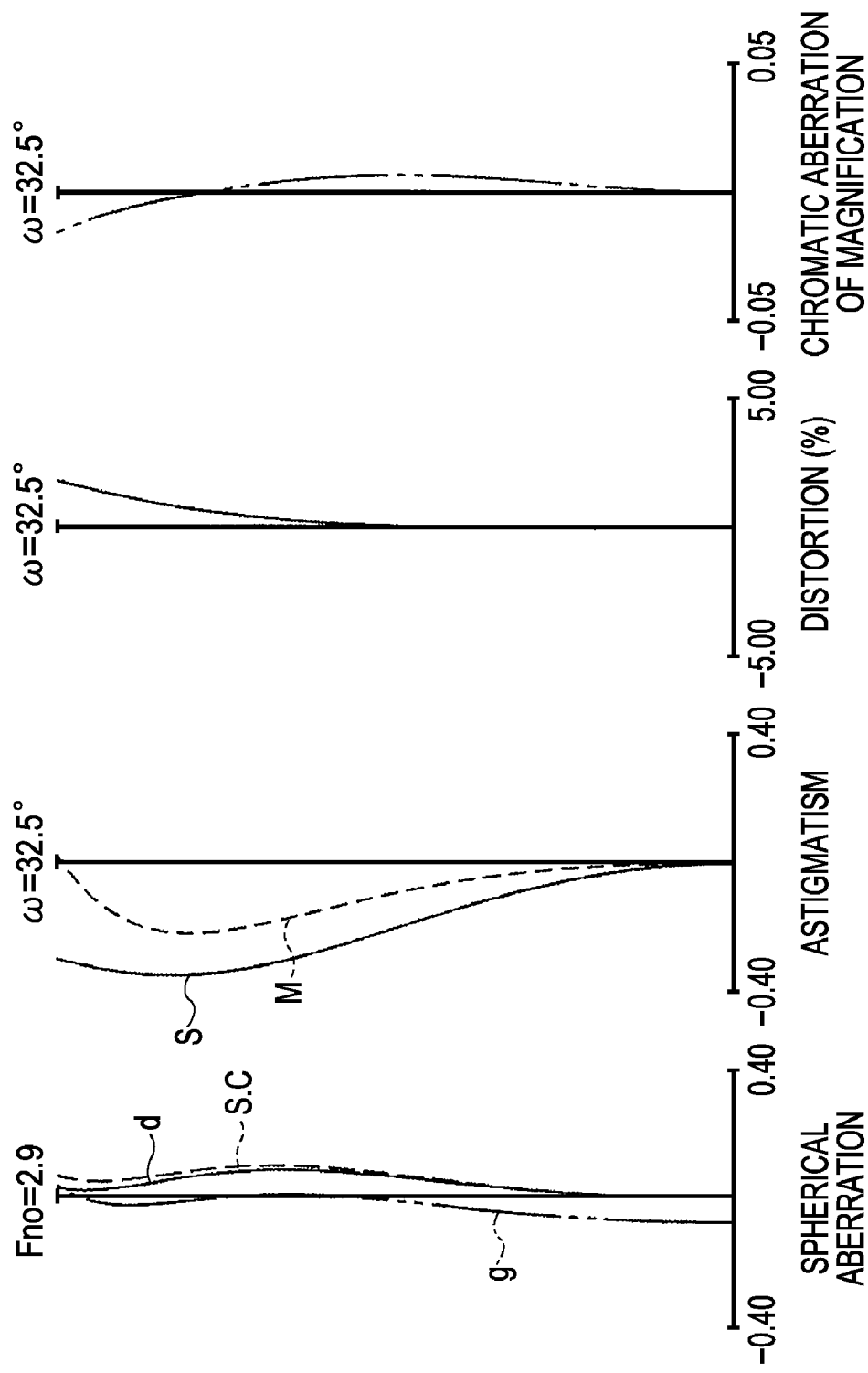
FIG. 9 is an aberration diagram of the zoom lens of Embodiment 3 when the object distance is infinity at the telephoto end.

FIGS. 8 and 9 are aberration diagrams of the zoom lens of Embodiment 3 when the object distance is infinity at the wide-angle end and the telephoto end, respectively.

Figure 10:
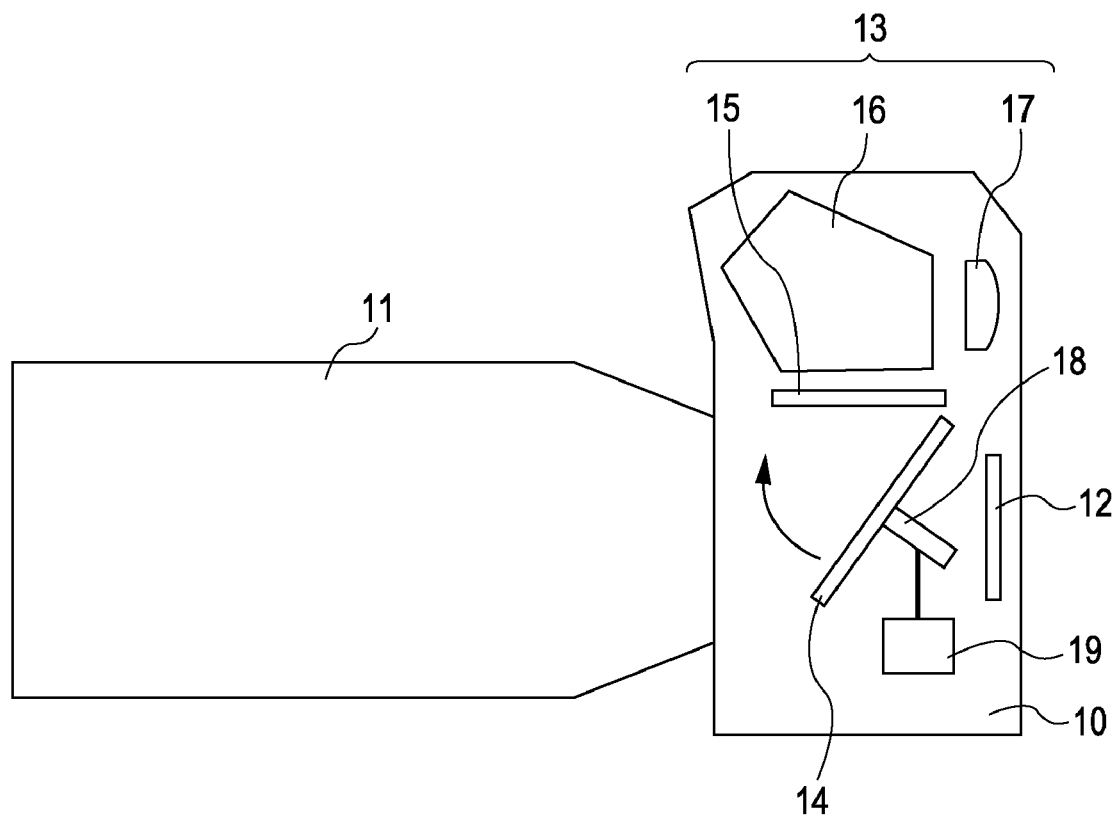
FIG. 10 is a schematic view of an image pickup apparatus of the present invention.

FIG. 10 is a schematic view of a single-lens reflex camera (image pickup apparatus) having a zoom lens of the present invention.

Figure 11:
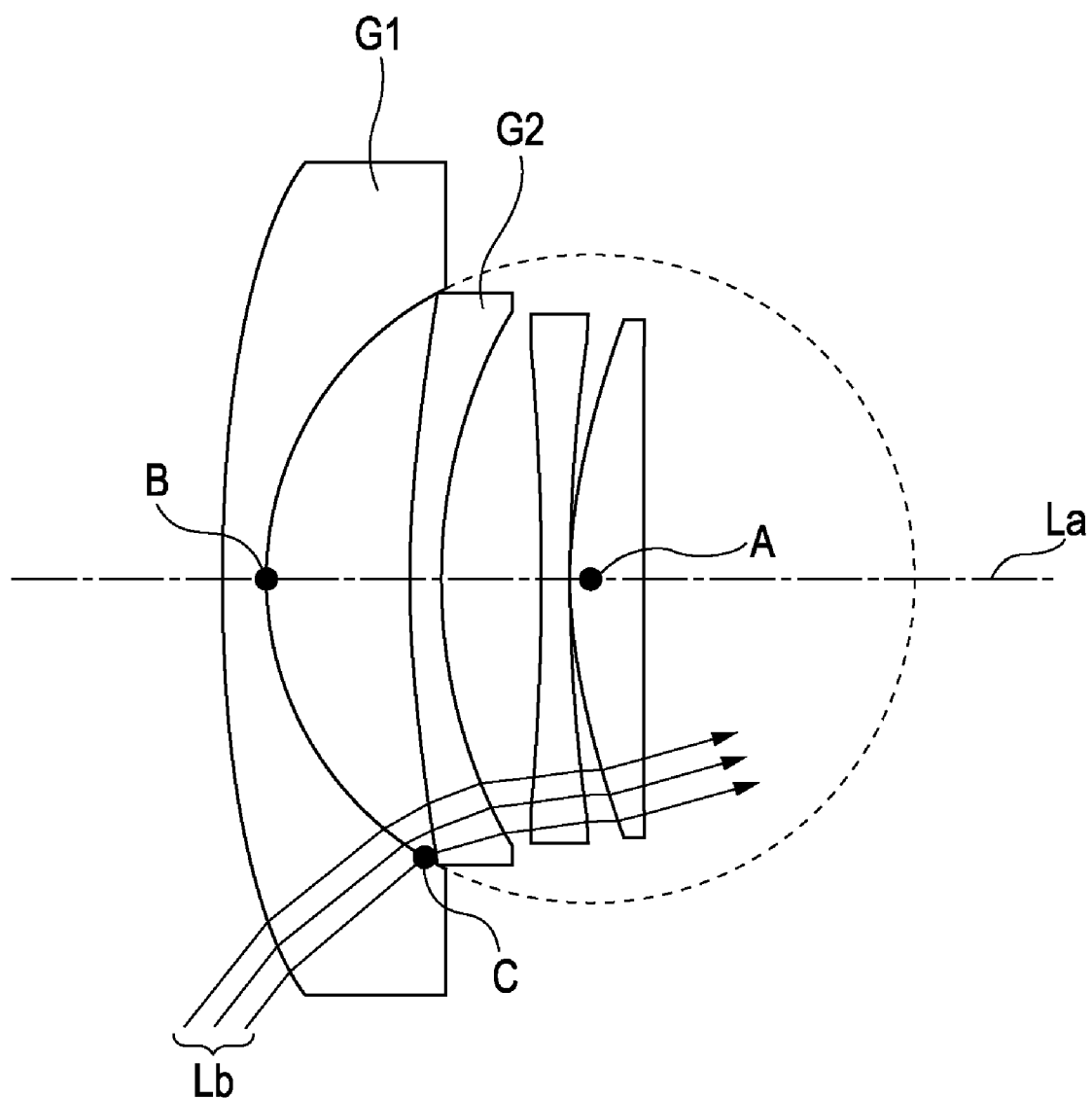
FIG. 11 illustrates the definition of reference spherical surface according to the present invention.

FIG. 11 illustrates a reference spherical surface according to the present invention.

The zoom lens of each embodiment is a photographing lens system (optical system) used in image pickup apparatuses such as video cameras, digital cameras, and silver-halide film cameras. In the lens sectional views, the left side is the object side (the front side), and the right side is the image side (the rear side). In the lens sectional views, reference letter Li denotes the i-th lens unit from the object side. Reference letter SP denotes an aperture stop. Reference letter SSP denotes an open Fno stop (open F-number stop) that regulates the open F-number.

Reference letter IP denotes an image plane. When the zoom lens is used as a photographing optical system for a video camera or a digital still camera, the image plane corresponds to the image pickup plane of a solid-state image pickup element (photoelectric conversion element) such as a CCD sensor or a CMOS sensor. In the case of a silver-halide film camera, the image plane corresponds to the film plane.

In the aberration diagrams, reference letters d and g denote the d-line and g-line, respectively. Reference letter S.C. denotes the sine condition. Reference letters M and S denote the meridional image plane and the sagittal image plane, respectively, of the d-line. The chromatic aberration of magnification is indicated by the g-line. Reference letter Fno denotes the F-number. Reference letter ω denotes the half field angle.

In each of the following embodiments, the wide-angle end and the telephoto end refer to the zooming positions where the lens units for zooming are located at either end of their mechanically movable ranges on the optical axis.

In each embodiment, the zoom lens has, in order from the object side to the image side, a first lens unit L1 of negative refractive power, a second lens unit L2 of positive refractive power, a third lens unit L3 of negative refractive power, and a fourth lens unit L4 of positive refractive power.

A converter lens or an afocal lens unit may be located on the object side of the first lens unit L1 and/or on the image side of the fourth lens unit L4.

During zooming from the wide-angle end to the telephoto end, the lens units L1 to L4 move on the optical axis as shown by arrows so that the distances between the lens units L1 to L4 change.

Specifically, with the zooming from the wide-angle end to the telephoto end, the distances between the lens units change as follows. The air distance between the first and second lens units L1 and L2 decreases. The air distance between the second and third lens units L2 and L3 increases. The air distance between the third and fourth lens units L3 and L4 decreases.

The first lens unit L1 moves in a locus convex toward the image side. The second to fourth lens units L2 to L4 move toward the object side.

The aperture stop SP and the open F-number stop SSP move together with the third lens unit L3 during zooming.

In each embodiment, due to the above configuration, at the wide-angle end, the first lens unit L1 has negative refractive power, and the combined refractive power of the second to fourth lens units L2 to L4 is positive, and therefore the whole lens system is of a retro-focus type refractive power arrangement. This is advantageous to achieving a wide field angle at the wide-angle end.

In addition, the first lens unit L1 is nonlinearly moved during zooming so that the image plane variation due to zooming is corrected.

The second lens unit L2 consists of, in order from the object side to the image side, a front unit L2a of positive refractive power and a rear unit L2b of positive refractive power, with the largest air distance therebetween.

The front unit L2a is a lens unit that moves on the optical axis to perform focusing.

The air distances between the lenses in the first lens unit L1 do not change during zooming and focusing.

The first lens unit L1 has, in order from the object side to the image side, three successive negative lenses and at least one positive lens. Of the surfaces of these lenses, at least one surface is aspheric.

The three negative lenses of the first lens unit L1 consist of, in order from the object side to the image side, two negative meniscus lenses concave toward the image side, and one negative biconcave lens.

Configuring the first lens unit L1 as above effectively divides a strong negative refractive power necessary to achieve a wide field angle among the three negative lenses. This configuration controls aberrations in the periphery, such as curvature of field and distortion, which increase when the field angle is increased. In addition, disposing a positive lens as the fourth lens from the object side in the first lens unit L1 corrects spherical aberration and comatic aberration generated in the three negative lenses.

The most object-side surface of the first lens unit L1 is aspherical. This effectively corrects off-axis aberration when the field angle is increased.

The first lens unit L1 can have at least two aspherical surfaces.

This facilitates effective correction of distortion and curvature of field at the wide-angle end.

In each embodiment, at least one of the following conditions is satisfied, and thereby an advantage corresponding to each condition is obtained.

In the embodiments, in order to appropriately express the aspherical lens surfaces in the first lens unit L1, a spherical surface referred to as "reference spherical surface" is defined as follows.

FIG. 11 is a lens sectional view illustrating the definition of the reference spherical surface.

Let the paraxial center of curvature of a lens surface be on the optical axis La. In FIG. 11, the point A is the center of curvature (center point). Let B be the point of the intersection of the lens surface and the optical axis La.

Let C be a point on the lens surface determined by the effective aperture (farthest point from the optical axis La).

The point C corresponds to a farthest point from the optical axis La where a light beam Lb of the maximum field angle passes through the lens surface when a zoom lens of the present invention is used in an image pickup apparatus.

A reference spherical surface is defined as a spherical surface that includes a circle passing through the points B and C and centered at the point A.

When the lens surface is spherical, the reference spherical surface is the lens surface itself, and the radius of curvature of the lens surface corresponds to the radius of curvature of the reference spherical surface.

Let r12 be the radius of curvature of the image-side reference spherical surface of the most object-side negative lens G1 in the first lens unit L1, and r21 the radius of curvature of the object-side reference spherical surface of the second most object-side negative lens G2 in the first lens unit L1.

Let f11 be the focal length of the most object-side negative lens G1 in the first lens unit L1, and f12 the focal length of the second most object-side negative lens G2 in the first lens unit L1.

Let d1 be the air distance on the optical axis between the most object-side negative lens G1 and the second most object-side negative lens G2 in the first lens unit L1, and d2 the air distance on the optical axis between the second most object-side negative lens G2 and the third most object-side negative lens G3 in the first lens unit L1.

Let f1 be the focal length of the first lens unit L1, f2 the focal length of the second lens unit L2, and fw the focal length of the whole system at the wide-angle end.

At least one of the following conditions is satisfied:

$$-2.8 < (r12+r21)/(r12-r21) < -1.0 \quad (1)$$

$$1.5 < f12/f11 < 5.0 \quad (2)$$

$$0.9 < d1/d2 < 3.0 \quad (3)$$

$$0.9 < |f1|/fw < 1.7 \quad (4)$$

$$1.5 < f2/fw < 2.8 \quad (5)$$

Next, the technical meaning of each conditional expression will be described.

When the first lens unit L1 has three successive negative lenses disposed from the most object side to the image side, the aperture of the first lens unit L1 tends to be large and therefore the size of the optical system tends to be large. In the zoom lens of each embodiment, by satisfying the conditional expression (1), a wide field angle can be easily achieved while restraining the size of the optical system from increasing.

The conditional expression (1) shows that the air lens formed between the negative lenses G1 and G2 has an overall shape close to a convex-plane shape. This assigns a comparatively large part of the negative refractive power in the periphery of the lens to the most object-side negative lens G1 as long as optical performance and the compactness of the whole lens system are balanced.

When (r12+r21)/(r12-r21) is below the lower limit of the conditional expression (1) and the shape of the air lens is far removed from a convex-plane shape, the negative refractive power in the periphery of the lens tends to disperse and the aperture of the lens is undesirably increased.

When (r12+r21)/(r12-r21) exceeds the upper limit of the conditional expression (1) and the air lens is biconvex, the negative refractive power in the periphery of the lens is excessively concentrated in the most object-side negative lens G1. As a result, it is difficult to correct aberrations such as curvature of field and distortion.

When f12/f11 is below the lower limit of the conditional expression (2) and the refractive power of the most object-side negative lens G1 is too weak, the size of the lens system of the first lens unit L1 is undesirably increased. When f12/f11 exceeds the upper limit of the conditional expression (2) and the refractive power of the most object-side negative lens G1 is too strong, it is difficult to correct aberrations such as comatic aberration and curvature of field.

When d1/d2 is below the lower limit of the conditional expression (3) and the air distance d2 is too large, the negative lenses G1 and G2, which have comparatively large apertures, are disposed apart from the other lenses, and therefore the optical system is undesirably increased. When d1/d2 exceeds the upper limit of the conditional expression (3) and the air distance d1 is large, the negative lens G1 is disposed apart from the other lenses, and therefore the optical system is undesirably increased.

Satisfying the conditional expression (1) in addition to the conditional expression (3) makes it easier to reduce the size of the optical system of the first lens unit L1.

The conditional expressions (4) and (5) are for maintaining a proper balance of the compactness and optical performance of the optical system while achieving a wide field angle.

When |f1|/fw is below the lower limit of the conditional expression (4) and the refractive power of the first lens unit L1 is too strong, off-axis aberration is significantly generated especially at the wide-angle end and this is difficult to correct.

When |f1|/fw exceeds the upper limit of the conditional expression (4) and the refractive power of the first lens unit L1 is too weak, it is difficult to achieve a wide field angle and to obtain a sufficient back focus while reducing the size of the optical system.

When f2/fw is below the lower limit of the conditional expression (5) and the refractive power of the second lens unit L2 is too strong, on-axis aberration is significantly generated and this is difficult to correct.

When f2/fw exceeds the upper limit of the conditional expression (5) and the refractive power of the second lens unit L2 is too weak, the moving distance for zooming is increased and therefore the size of the optical system is undesirably increased.

The numerical ranges of the conditional expressions (1) to (5) can be set as follows:

$$-2.2 < (r12+r21)/(r12-r21) < -1.1 \quad (1a)$$

$$2.0 < f12/f11 < 4.6 \quad (2a)$$

$$1.2 < d1/d2 < 2.7 \quad (3a)$$

$$1.1 < |f1|/fw < 1.6 \quad (4a)$$

$$1.7 < f2/fw < 2.6 \quad (5a)$$

As described above, in the embodiments, a zoom lens has at least two lens units of negative and positive refractive power in order from the object side to the image side, and the configuration of the negative first lens unit is appropriately set. A wide field angle is thereby achieved while reducing the size of the optical system. In addition, high performance is achieved throughout the zoom region and throughout the focusing region.

In each embodiment, when an object to be photographed changes from infinity to finite distance, the second lens unit L2 is separated into the front unit L2a of positive refractive power and the rear unit L2b of positive refractive power, and focusing is performed by moving the front unit L2a on the optical axis.

Therefore, it is easy to perform focusing with a lens unit having sufficient focusing sensitivity. In addition, the driving distance necessary for focusing is small, and the change in the distances between the lenses during focusing is small. Therefore, the fluctuation in aberrations is small.

Unlike the method in which the first lens unit is separated into a front unit and a rear unit and focusing is performed by changing the air distance therebetween, the distances between the lenses in the first lens unit L1, in which the refraction angle of rays is large at the wide-angle end, do not change. Therefore, the fluctuation in aberrations such as image plane variation in the periphery due to focusing can be easily restrained.

The front unit L2a consists of, in order from the object side to the image side, a negative meniscus lens convex toward the object side, a positive lens, and a positive lens. Specifically, the front unit L2 consists of a negative meniscus lens convex toward the object side, a positive lens convex toward the object side, and a positive lens convex toward the object side. The negative lens and the positive lens on the image side thereof are cemented. The cemented lens has positive refractive power.

By configuring the front unit L2a as above, focusing is performed with sufficient focusing sensitivity. Therefore, the driving distance necessary for focusing is small, and the change in the distances between the lenses during focusing is small. Therefore, the fluctuation in aberrations is small.

The rear unit L2b of the second lens unit L2 is a biconvex positive lens.

Further characteristics of the lens configuration of each embodiment will be described.

In the zoom lens of Numerical Embodiment 1 shown in FIG. 1, in order to further improve optical performance, the object-side surface of the most object-side negative lens G1 in the first lens unit L1 and the image-side surface of the second most object-side negative lens G2 in the first lens unit L1 are aspherical. This effectively corrects distortion and curvature of field, which are significant especially at the wide-angle end.

The aspherical shape disposed on the object side of the negative lens G1 is a shape such that the negative refractive power decreases from the center of the lens toward the periphery of the lens. This effectively corrects curvature of field and distortion especially at the wide-angle end.

In addition, the effective aperture of the object-side surface of the negative lens G1 can be easily reduced. Therefore, the size of the first lens unit L1 can also be easily reduced. The aspherical surface disposed in the negative lens G2 is used to effectively correct remaining aberrations that the aspherical surface of the negative lens G1 cannot completely correct, especially the curvature of field in the periphery at the wide-angle end.

The aspherical surfaces used in Embodiment 1 are formed directly in the glass surfaces. However, of course, the present invention is not limited to this. The aspherical surfaces may be so-called complex aspherical surfaces such that an aspherical resin layer is formed on a base glass.

When the aspherical surfaces are formed directly in the glass surfaces, the aspherical surfaces may be formed by any method, for example, grinding or molding.

In Embodiment 1, in order to further improve optical performance, an aspherical surface such that the negative refractive power increases as the distance from the center of the lens increases is disposed in the fourth lens unit L4. This effectively corrects negative distortion generated especially at the wide-angle end, and achieves excellent optical performance in cooperation with the aspherical surfaces disposed in the first lens unit L1.

The third lens unit L3 consists of, in order from the object side to the image side, a biconcave negative lens, a biconcave negative lens, and a biconvex positive lens.

The fourth lens unit L4 consists of a biconvex positive lens, a negative meniscus lens convex toward the image side, a negative meniscus lens convex toward the object side, a biconvex positive lens, and a positive lens.

The basic lens configuration and the above-described characteristics of the zoom lens of Embodiment 2 shown in FIG. 4 are the same as those of Numerical Embodiment 1.

In Embodiment 2, the object-side surface of the most object-side negative lens G1 in the first lens unit L1 is aspherical. In addition, the image-side surface of the second most object-side negative meniscus lens G2 in the first lens unit L1 is a complex aspherical shape.

Other characteristics are the same as those of Embodiment 1.

The characteristics of the zoom lens of Embodiment 3 shown in FIG. 7 are the same as those of Embodiment 2.

In Embodiment 3, the object-side surface of the most object-side negative lens G1 in the first lens unit L1 and the object-side surface of the second most object-side negative meniscus lens G2 in the first lens unit L1 are aspherical.

Other characteristics are the same as those of Embodiment 1. In each embodiment, by adopting these configurations, a zoom lens that has a wide field angle and high optical performance throughout the zoom region and throughout the focusing region is achieved, while reducing the size of the optical system.

The zoom lens of the present invention includes, in order from the object side to the image side, a first lens unit of negative refractive power and a second lens unit of positive refractive power.

In the zoom lens, at least the first lens unit and the second lens unit move on the optical axis so that the distance between the first lens unit and the second lens unit decreases during zooming from the wide-angle end to the telephoto end.

The present invention can also be applied to a three-unit zoom lens, a four-unit zoom lens, and a five-unit zoom lens in which one or more lens units are disposed on the image side of the second lens unit.

The following are Numerical Embodiments 1 to 3 corresponding to Embodiments 1 to 3. In each Numerical Embodiment, numbers (i) denote the order of surfaces from the object side. Reference letter ri denotes the radius of curvature of the i-th surface. Reference letter di denotes the thickness or air distance between the i-th surface and the (i+1)th surface. Reference letters ni and vi denote the refractive index and the Abbe number, respectively, for the d-line. Reference letter f denotes the focal length. Reference letter Fno denotes the F-number. Reference letter ω denotes the half field angle. In each embodiment, an aspherical shape is defined by the following expression:

$$X = (h^3/R) / \left[1 + \sqrt{(1-(h/R)^2)}\right] + B \cdot h^4 + C \cdot h^6 + D \cdot h^8 + E \cdot h^{10} + F \cdot h^{12}$$

where X is an amount of displacement in the direction of the optical axis on a lens surface at a distance h from the optical axis; R is a radius of curvature; and B, C, D, E, and F are 4th-, 6th-, 8th-, 10th-, and 12th-order aspherical coefficients, respectively. Table 1 shows the relationship between the above conditional expressions and numerical values in the numerical embodiments.

Numerical Embodiment 1 f=16.5~33.9 FNo=1: 2.9~2.9 2ω=105.4°~65.0° r 1=125.694 (aspherical surface) d 1=2.00 n 1=1.77250 ν 1=49.6 r 2=22.323 d 2=8.46 r 3=83.965 d 3=1.80 n 2=1.69350 ν 2=53.2 r 4=45.445 (aspherical surface) d 4=4.95 r 5=−185.919 d 5=1.20 n 3=1.77250 ν 3=49.6 r 6=45.233 d 6=2.67 r 7=41.692 d 7=3.49 n 4=1.84666 ν 4=23.9 r 8=133.102 d 8=variable r 9=65.389 d 9=1.30 n 5=1.80518 ν 5=25.4 r10=24.732 d10=7.00 n 6=1.54072 ν 6=47.2 r11=−77.629 d11=0.15 r12=45.344 d12=2.32 n 7=1.51633 ν 7=64.1 r13=95.466 d13=4.34 r14=71.584 d14=3.40 n 8=1.71999 ν 8=50.2 r15=−95.385 d15=variable r16=aperture stop d16=1.50 r17=−98.572 d17=1.40 n 9=1.88300 ν9=40.8 r18=156.199 d18=2.10 r19=−42.174 d19=1.05 n10=1.72342 ν10=38.0 r20=25.070 d20=6.84 n11=1.84666 ν11=23.9 r21=−115.748 d21=0.50 r22=open Fno stop d22=variable r23=32.371 d23=7.53 n12=1.49700 ν12=81.5 r24=−24.237 d24=1.20 n13=1.84666 ν13=23.9 r25=−37.055 d25=0.20 r26=134.864 d26=1.20 n14=1.83400 ν14=37.2 r27=23.381 d27=6.06 n15=1.49700 ν15=81.5 r28=−91.831 d28=0.15 r29=−225.022 d29=2.50 n16=1.69350 ν16=53.2 r30=−141.436 (aspherical surface)

focal length 16.48 25.60 33.95 variable distance d 8 24.19 8.31 1.82 d 15 0.80 7.19 11.63 d 22 11.03 4.63 0.20 aspherical coefficient (1st surface)

B=1.308623e-05  C=−1.712362e-08  D=2.283492e-11  E=−1.937373e-14 F=7.463068e-18

(4th surface)

B=1.038522e-05  C=−4.243209e-09  D=−3.649043e-11  E=4.578133e-14 F=0.0

(30th surface)

B=1.048439e-05 C=1.548601e-08 D=2.614619e-11 E=0.0 F=0.0

Numerical Embodiment 2 f=16.5~33.9 FNo=1: 2.9~2.9 2ω=105.4°~65.0° r 1=450.375 (aspherical surface) d 1=2.30 n 1=1.77250 ν 1=49.6 r 2=21.000 d 2=9.33 r 3=105.660 d 3=1.80 n 2=1.80400 ν 2=46.6 r 4=37.193 d 4=0.16 n 3=1.51640 ν 3=52.2 r 5=45.379 (aspherical surface) d 5=5.67 r 6=−139.831 d 6=1.60 n 4=1.83400 ν 4=37.2 r 7=112.189 d 7=0.15 r 8=45.210 d 8=4.50 n 5=1.80510 ν 5=25.4 r 9=1114.049 d 9=variable r10=58.687 d10=1.30 n 6=1.80518 ν 6=25.4 r11=24.574 d11=5.20 n 7=1.54072 ν 7=47.2 r12=−1301.196 d12=0.15 r13=89.053 d13=2.55 n 8=1.80400 ν 8=46.6 r14=−206.868 d14=4.61 r15=64.065 d15=3.80 n 9=1.62299 ν 9=58.2 r16=−79.408 d16=variable r17=aperture stop d17=1.89 r18=−142.558 d18=1.40 n10=1.88300 ν10=40.8 r19=103.786 d19=2.34 r20=−38.211 d20=1.10 n11=1.76200 ν11=40.1 r21=23.493 d21=5.50 n12=1.84666 ν12=23.8 r22=−100.183 d22=1.25 r23=open Fno stop d23=variable r24=35.975 d24=8.50 n13=1.49700 ν13=81.5 r25=−21.336 d25=1.20 n14=1.84666 ν14=23.9 r26=−33.052 d26=0.20 r27=209.038 d27=1.20 n15=1.83400 ν15=37.2 r28=22.424 d28=6.95 n16=1.49700 ν16=81.5 r29=−133.647 d29=0.20 r30=154.194 d30=2.90 n17=1.58313 ν17=59.4 r31=−151.013 (aspherical surface)

focal length 16.49 24.01 33.94 variable distance d 9 26.27 10.51 1.48 d 16 0.94 5.36 10.71 d 23 9.96 5.54 0.19 aspherical coefficient (1st surface)

B=1.684535e-05  C=−2.660002e-08  D=3.521074e-11
E=−2.935318e-14 F=1.049151e-17

(5th surface)

B=1.536248e-05  C=1.293314e-09  D=−1.051563e-10
E=1.631412e-13 F=−1.887261e-16

(31st surface)

B=7.231494e-06  C=1.208044e-08  D=−1.273339e-11
E=3.088998e-14 F=0.0

Numerical Embodiment 3 f=16.5~33.9 FNo=1: 2.9~2.9 2ω=105.4°~65.0° r 1=944.097 (aspherical surface) d 1=2.00 n 1=1.77250 ν 1=49.6 r 2=23.280 d 2=10.10 r 3=126.521 (aspherical surface) d 3=1.80 n 2=1.77250 ν 2=49.6 r 4=47.658 d 4=4.58 r 5=−182.661 d 5=1.60 n 3=1.80400 ν 3=46.6 r 6=147.348 d 6=2.84 r 7=60.815 d 7=3.17 n 4=1.84666 ν 4=23.9 r 8=506.364 d 8=variable r 9=128.381 d 9=1.30 n 5=1.80518 ν 5=25.4 r10=31.678 d10=4.81 n 6=1.58318 ν 6=44.1 r11=−87.046 d11=0.15 r12=60.829 d12=2.44 n 7=1.48749 ν 7=70.2 r13=−1650.159 d13=5.05 r14=66.895 d14=3.40 n 8=1.64182 ν 8=53.8 r15=−85.230 d15=variable r16=aperture stop d16=2.19 r17=−137.572 d17=1.40 n 9=1.88300 ν 9=40.8 r18=104.024 d18=2.68 r19=−32.203 d19=1.10 n10=1.72434 ν10=41.0 r20=24.795 d20=5.55 n11=1.84666 ν11=23.9 r21=−90.165 d21=1.10 r22=open Fno stop d22=variable r23=29.807 d23=8.49 n12=1.49700 ν12=81.5 r24=−23.552 d24=1.20 n13=1.84666 ν13=23.9 r25=−37.376 d25=0.20 r26=290.590 d26=1.20 n14=1.83400 ν14=37.2 r27=21.100 d27=7.08 n15=1.49700 ν15=81.5 r28=−74.832 d28 0.20 r29=370.661 d29=2.70 n16=1.69350 ν16=53.2 r30=−196.370 (aspherical surface)

focal length 16.48 25.22 33.95 variable distance d 8 29.45 9.70 1.00 d 15 1.02 5.22 9.02 d 22 8.20 3.99 0.20 aspherical coefficient (1st surface)

B=1.430010e-05  C −1.845114e-08  D=2.226123e-11
E=−1.730773e-14 F=6.015051e-18

(3rd surface)

B=−7.609713e-06  C=−2.500632e-09  D=3.322961e-11
E=−3.578284e-14 F=0.0

(30th surface)

B=8.842938e-06 C=1.199046e-08 D=2.133143e-11 E=0.0 F=0.0

TABLE 1

| Conditional expression | | Embodiment 1 | Embodiment 2 | Embodiment 3 |
|---|---|---|---|---|
| (1) | (r12 + r21)/(r12 − r21) | −1.72 | −1.50 | −1.19 |
| (2) | f12/f11 | 4.11 | 3.08 | 3.23 |
| (3) | d1/d2 | 1.71 | 1.65 | 2.20 |
| (4) | \|f1\|/fw | 1.33 | 1.38 | 1.52 |
| (5) | f2/fw | 2.03 | 1.95 | 2.07 |

Next, an embodiment of a single-lens reflex camera system using the zoom lens (optical system) of the present invention will now be described with reference to FIG. 10. In FIG. 10, reference numeral 10 denotes a main body of a single-lens reflex camera, and reference numeral 11 denotes an interchangeable lens including the zoom lens of the present invention.

Reference numeral 12 denotes a recording unit such as a film or a solid-state image pickup element on which is recorded an object image obtained through the interchangeable lens 11. Reference numeral 13 denotes a finder optical system for observing an object image coming from the interchangeable lens 11.

Reference numeral 14 denotes a swingable quick return mirror for switching between image transmission to the recording unit 12 and image transmission to the finder optical system 13.

When observing an object image with the finder, the object image reflected by the quick return mirror 14 and focused onto a focusing plate 15 is converted into an erected image by a pentagonal prism 16, and is then magnified by an eyepiece optical system 17.

During photographing, the quick return mirror 14 swings in the direction of the arrow, and the object image is focused and recorded on the recording unit 12. Reference numeral 18 denotes a submirror, and reference numeral 19 denotes a focal point detector.

By applying the zoom lens of the present invention to an image pickup apparatus such as an interchangeable lens for a single-lens reflex camera, an image pickup apparatus having high optical performance can be achieved.

The present invention can also be applied to a single-lens reflex camera without a quick return mirror.

As described above, each embodiment provides a zoom lens that is suitable for use in a photographing system using a solid-state image pickup element, that is compact, and that has excellent optical performance, and an image pickup apparatus having the same.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-127830 filed May 14, 2007, which is hereby incorporated by reference herein in its entirety.

What is claimed is:

1. A zoom lens comprising in order from the object side to the image side:

a first lens unit of negative refractive power; and a second lens unit of positive refractive power, wherein at least the first lens unit and the second lens unit move on the optical axis so that the distance between the first lens unit and the second lens unit decreases during zooming from a wide-angle end to a telephoto end, wherein the first lens unit includes, in order from the object side to the image side, three negative lenses and a positive lens, at least one of the surfaces of the lenses being aspherical, wherein the first lens unit has, in order from the object side to the image side, two negative meniscus lenses concave toward the image side and one negative biconcave lens, and wherein when a spherical surface whose center of curvature is on the optical axis and that includes a point of the intersection of a lens surface and the optical axis and a point on the lens surface determined by an effective aperture is referred to as reference spherical surface of the lens surface, the following condition is satisfied:

$$-2.8 < (r12+r21)/(r12-r21) < -1.0$$

where r12 is the radius of curvature of the image-side reference spherical surface of the most object-side negative lens in the first lens unit, and r21 is the radius of curvature of the object-side reference spherical surface of the second most object-side negative lens in the first lens unit.

2. The zoom lens according to claim 1, wherein the following condition is satisfied:

$$1.5 < f12/f11 < 5.0$$

where f11 is the focal length of the most object-side negative lens in the first lens unit, and f12 is the focal length of the second most object-side negative lens in the first lens unit.

3. The zoom lens according to claim 1, wherein the most object-side surface in the first lens unit is aspherical.

4. The zoom lens according to claim 1, wherein the first lens unit has at least two aspherical surfaces.

5. The zoom lens according to claim 1, wherein the following condition is satisfied:

$$0.9 < d1/d2 < 3.0$$

where d1 is the air distance on the optical axis between the most object-side negative lens and the second most object-side negative lens in the first lens unit, and d2 is the air distance on the optical axis between the second most object-side negative lens and the third most object-side negative lens in the first lens unit.

6. The zoom lens according to claim 1, wherein the following condition is satisfied:

$$0.9 < |f1|/fw < 1.7$$

$$1.5 < f2/fw < 2.8$$

where f1 is the focal length of the first lens unit, f2 is the focal length of the second lens unit, and fw is the focal length of the whole system at the wide-angle end.

7. The zoom lens according to claim 1, further comprising a third lens unit of negative refractive power and a fourth lens unit of positive refractive power disposed in this order on the image side of the second lens unit.

8. The zoom lens according to claim 1, wherein the zoom lens is an optical system for forming an image on a solid-state image pickup element.

9. An image pickup apparatus comprising:

a zoom lens according to claim 1; and a solid-state image pickup element that picks up an image formed by the zoom lens.

10. A zoom lens comprising in order from the object side to the image side:

a first lens unit of negative refractive power; and a second lens unit of positive refractive power, wherein at least the first lens unit and the second lens unit move on the optical axis so that the distance between the first lens unit and the second lens unit decreases during zooming from a wide-angle end to a telephoto end, wherein the first lens unit includes, in order from the object side to the image side, three negative lenses and a positive lens, at least one of the surfaces of the lenses being aspherical, wherein the first lens unit has, in order from the object side to the image side, two negative meniscus lenses concave toward the image side and one negative biconcave lens, and wherein when a spherical surface whose center of curvature is on the optical axis and that includes a point of the intersection of a lens surface and the optical axis and a point on the lens surface determined by an effective aperture is referred to as reference spherical surface of the lens surface, the following condition is satisfied:

$$0.9 < d1/d2 < 3.0$$

where d1 is the air distance on the optical axis between the most object-side negative lens and the second most object-side negative lens in the first lens unit, and d2 is the air distance on the optical axis between the second most object-side negative lens and the third most object-side negative lens in the first lens unit.

11. The zoom lens according to claim 10, wherein the zoom lens is an optical system for forming an image on a solid-state image pickup element.

12. An image pickup apparatus comprising:

a zoom lens according to claim 10; and a solid-state image pickup element that picks up an image formed by the zoom lens.

13. A zoom lens comprising in order from the object side to the image side:

a first lens unit of negative refractive power; and a second lens unit of positive refractive power, wherein at least the first lens unit and the second lens unit move on the optical axis so that the distance between the first lens unit and the second lens unit decreases during zooming from a wide-angle end to a telephoto end, wherein the first lens unit includes, in order from the object side to the image side, three negative lenses and a positive lens, at least one of the surfaces of the lenses being aspherical, wherein the first lens unit has, in order from the object side to the image side, two negative meniscus lenses concave toward the image side and one negative biconcave lens, and wherein when a spherical surface whose center of curvature is on the optical axis and that includes a point of the intersection of a lens surface and the optical axis and a point on the lens surface determined by an effective aperture is referred to as reference spherical surface of the lens surface, the following condition is satisfied:

$$0.9 < |f1|/fw < 1.7$$

$$1.5 < f2/fw < 2.8$$

where f1 is the focal length of the first lens unit, f2 is the focal length of the second lens unit, and fw is the focal length of the whole system at the wide-angle end.

14. The zoom lens according to claim 13, wherein the zoom lens is an optical system for forming an image on a solid-state image pickup element.

15. An image pickup apparatus comprising:
a zoom lens according to claim 13; and
a solid-state image pickup element that picks up an image formed by the zoom lens.

* * * * *